United States Patent
Kuan et al.

(10) Patent No.: US 12,204,692 B1
(45) Date of Patent: Jan. 21, 2025

(54) TOUCH MODULE

(71) Applicant: Primax Electronics Ltd., Taipei (TW)

(72) Inventors: Tse-Ping Kuan, Taipei (TW);
Wei-Chiang Huang, Taipei (TW);
Hung-Wei Kuo, Taipei (TW);
Ying-Yen Huang, Taipei (TW); Sian-Yi Chiu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 18/372,638

(22) Filed: Sep. 25, 2023

(30) Foreign Application Priority Data

Jul. 7, 2023 (TW) .................. 112125427

(51) Int. Cl.
*G06F 3/01* (2006.01)
*G06F 3/0354* (2013.01)
*H01F 7/08* (2006.01)

(52) U.S. Cl.
CPC .......... *G06F 3/016* (2013.01); *G06F 3/03547* (2013.01); *H01F 7/081* (2013.01)

(58) Field of Classification Search
CPC ....... G06F 3/016; G06F 3/03547; H01F 7/081
See application file for complete search history.

(56) References Cited

U.S. PATENT DOCUMENTS

| | | | | |
|---|---|---|---|---|
| 10,525,690 B2* | 1/2020 | Wang | ............ | H01F 17/04 |
| 11,460,926 B2* | 10/2022 | Junus | ............ | H03K 17/9618 |
| 11,619,997 B1* | 4/2023 | Kuo | ............ | G06F 3/016 |
| | | | | 345/173 |
| 11,880,506 B2* | 1/2024 | Rosenberg | ............ | H01H 13/85 |
| 11,983,377 B2* | 5/2024 | Kuo | ............ | G06F 3/03547 |
| 12,093,458 B2* | 9/2024 | Rosenberg | ............ | G06F 3/016 |
| 2018/0068774 A1* | 3/2018 | Wang | ............ | H01F 41/0246 |
| 2021/0333880 A1* | 10/2021 | Junus | ............ | G06F 3/045 |
| 2023/0012830 A1* | 1/2023 | Rosenberg | ............ | G06F 3/016 |
| 2023/0074323 A1* | 3/2023 | Kim | ............ | H10N 35/00 |
| 2023/0229242 A1* | 7/2023 | Rosenberg | ............ | H01H 13/79 |
| | | | | 345/168 |
| 2024/0053857 A1* | 2/2024 | Kuo | ............ | G06F 3/04164 |
| 2024/0295928 A1* | 9/2024 | Junus | ............ | G06F 3/03547 |

* cited by examiner

*Primary Examiner* — Michael J Jansen, II
(74) *Attorney, Agent, or Firm* — KIRTON McCONKIE; Evan R. Witt

(57) ABSTRACT

A touch module includes a base plate, a first magnet, a second magnet, a touch pad, a first magnetic board and a second magnetic board. The first magnet and the second magnet are installed on the base plate and separated from each other. The touch pad is located over the base plate to cover the first magnet and the second magnet. The first magnetic board and the second magnetic board are separated from each other, located under the touch pad and coupled with the touch pad. The first magnetic board is aligned with the first magnet. The second magnetic board is aligned with the second magnet. The driving circuit is electrically coupled with the first magnetic board and the second magnetic board. The first magnetic board induces a magnetic field of the first magnet. The second magnetic board induces a magnetic field of the second magnet.

8 Claims, 8 Drawing Sheets

TOUCH MODULE

FIELD OF THE INVENTION

The present invention relates to a touch-sensitive input device, and more particularly to a touch module.

BACKGROUND OF THE INVENTION

Generally, a micro vibration in the main body of a haptics touch pad generates vibration feedback to the user. The feedback can prompt the user that the touch press action has been well executed and a pressing signal has been generated. The micro vibrators are usually divided into plural types. For example, the common micro vibrators are micro motors or electromagnetic induction vibration modules. Among the many micro vibrators, the one with the thinnest overall thickness is the electromagnetic induction vibration module. According to the principles of the electromagnetic induction vibration module, electricity flows through a coil to induce the magnetic field of a magnet. Consequently, the vibration effect can be produced.

Nowadays, the trends of designing electronic products are toward slimness, small size and light weightiness. Consequently, the demand of using the electromagnetic induction vibration module as the vibration source of the electronic product is gradually increased. However, in order to achieve the stable magnetic induction capability and provide the effective vibration, it is necessary to install a large-area winding coil in the electromagnetic induction vibration module. Furthermore, the installation position of the magnet needs to be accurately aligned with the coil, and thus the magnet and the coil interact with each other to produce the vibration effect. Due to the slimness design of the electronic product, the overall space of the touch pad is reduced. In other words, it is difficult to install the large-area coil and the magnet in the narrow touch pad structure. However, if the size of the coil and the size of the magnet are reduced, the vibration efficacy is impaired.

SUMMARY OF THE INVENTION

For solving the drawbacks of the conventional technologies, the present invention provides a touch module. The touch module includes plural separate magnetic induction coils and corresponding magnets. A touch pad is directly equipped with conductive circuits and conductive points. After the magnetic induction coils are directly and electrically connected with the conductive points of the touch pad, the plural separate magnetic induction coils are electrically connected with each other in series or in parallel through the internal conductive circuits of the touch pad. In other words, it is not necessary to install additional circuit boards or wires for the magnetic induction coils. In case that the plural magnetic induction coils are connected with each other in series, the circuitry structure is simplified, and the plural magnetic induction coils can be synchronously driven at a faster speed. In case that the plural magnetic induction coils are connected with each other in parallel, the vibration frequency and the performance of each magnetic induction coil can be stabilized. Even if the magnetic induction coils are installed at different positions, the same level of magnetic induction and vibration performance can be achieved. Moreover, the use of a single driving circuit can drive the electrical conduction of the plural magnetic induction coils to produce vibration. Consequently, the control precision is enhanced, and the vibration time error between the plural magnetic induction coils after driven will be reduced. This method allows the plural magnetic induction coils to approach simultaneous vibration. Moreover, since the plural magnetic induction coils are separately installed to achieve the function of structural avoidance, the locations of the magnetic induction coils will not influence the locations of other important components. Alternatively, the magnetic induction coils are located at the fragmented corners to achieve the optimal space utilization of the overall touch module. Moreover, since plural magnetic induction coils are discretely arranged, the plural vibration sources can be distributed in the same touch module. Consequently, the overall touch module can provide the uniform vibration effect. Even if one of the plural magnetic induction coils is damaged, the magnetic induction coils at other locations can be operated normally.

In accordance with an aspect of the present invention, a touch module is provided. The touch module includes a base plate, a first magnet, a second magnet, a touch pad, a first magnetic board and a second magnetic board. The first magnet is installed on the base plate. The second magnet is installed on the base plate and separated from the first magnet. The touch pad is located over the base plate to cover the first magnet and the second magnet. The touch pad includes an output point, an input point and a communication part. The first magnetic board is located under the touch pad, coupled with the touch pad, and aligned with the first magnet. The second magnetic board is located under the touch pad, coupled with the touch pad, and aligned with the second magnet. The second magnetic board is separated from the first magnetic board. The output point of the touch pad is electrically coupled with the first magnetic board. The input point of the touch pad is electrically coupled with the second magnetic board. The first magnetic board and the second magnetic board are electrically connected with each other through the communication part of the touch pad. The first magnetic board induces a magnetic field of the first magnet and generates vibration. The second magnetic board induces a magnetic field of the second magnet and generates vibration.

In an embodiment, the touch pad has a bottom surface. The bottom surface of the touch pad faces the first magnet and the second magnet. The output point and the input point of the touch pad are installed on the bottom surface of the touch pad.

In an embodiment, the touch pad includes a driving circuit, an output circuit and an input circuit. The driving circuit is connected with the output circuit and the input circuit. The output circuit is electrically coupled with the first magnetic board through the output point. The input circuit is electrically coupled with the second magnetic board through the input point.

In an embodiment, the first magnetic board has a first feed point and a first exit point, and the second magnetic board has a second feed point and a second exit point. The first feed point of the first magnetic board is electrically coupled with the output point of the touch pad. The first exit point of the first magnetic board and the second feed point of the second magnetic board are electrically coupled with the communication part of the touch pad. The second exit point of the second magnetic board is electrically coupled with the input point of the touch pad.

In an embodiment, the first magnetic board includes a first multilayered coil structure, and the second magnetic board includes a second multilayered coil structure. The first multilayered coil structure includes a first entry terminal and a first departure terminal. The second multilayered coil structure includes a second entry terminal and a second departure terminal. The first entry terminal of the first multilayered coil structure is connected with the first feed point of the first magnetic board. The first departure terminal of the first multilayered coil structure is connected with the first exit point of the first magnetic board. The second entry terminal of the second multilayered coil structure is connected with the second feed point of the second magnetic board. The second departure terminal of the second multilayered coil structure is connected with the second exit point of the second magnetic board.

In an embodiment, the communication part of the touch pad includes a first conducting terminal and a second conducting terminal, and the first conducting terminal and the second conducting terminal are connected with each other. The first exit point of the first magnetic board is electrically coupled with the first conducting terminal of the communication part. The second feed point of the second magnetic board is electrically coupled with the second conducting terminal of the communication part.

In accordance with another aspect of the present invention, a touch module is provided. The touch module includes a base plate, a first magnet, a second magnet, a touch pad, a first magnetic board and a second magnetic board. The first magnet is installed on the base plate. The second magnet is installed on the base plate and separated from the first magnet. The touch pad is located over the base plate to cover the first magnet and the second magnet. The touch pad includes an output part and an input part. The first magnetic board is located under the touch pad, coupled with the touch pad, and aligned with the first magnet. The first magnetic board has a first feed point and a first exit point. The second magnetic board is located under the touch pad, coupled with the touch pad, and aligned with the second magnet. The second magnetic board is separated from the first magnetic board. The second magnetic board has a second feed point and a second exit point. The first feed point of the first magnetic board and the second feed point of the second magnetic board are electrically coupled with the output part of the touch pad. The first exit point of the first magnetic board and the second exit point of the second magnetic board are electrically coupled with the input part of the touch pad. The first magnetic board induces a magnetic field of the first magnet and generates vibration. The second magnetic board induces a magnetic field of the second magnet and generates vibration.

In an embodiment, the touch pad has a bottom surface, and the output part and the input part of the touch pad are installed on the bottom surface of the touch pad. The output part includes a first output point and a second output point. The input part includes a first input point and a second input point. The first feed point of the first magnetic board is electrically coupled with the first output point of the output part. The second feed point of the second magnetic board is electrically coupled with the second output point of the output part. The first exit point of the first magnetic board is electrically coupled with the first input point of the input part. The second exit point of the second magnetic board is electrically coupled with the second input point of the input part.

In an embodiment, the touch pad includes a driving circuit, an output circuit and an input circuit. The driving circuit is connected with the output circuit and the input circuit. The output circuit has a first output terminal and a second output terminal. The input circuit has a first input terminal and a second input terminal. The first output terminal of the output circuit is connected with the first output point of the output part. The second output terminal of the output circuit is connected with the second output point of the output part. The first input terminal of the input circuit is connected with the first input point of the input part. The second input terminal of the input circuit is connected with the second input point of the input part.

In an embodiment, the first output terminal of the output circuit is electrically coupled with the first feed point of the first magnetic board through the first output point of the output part, the second output terminal of the output circuit is electrically coupled with the second feed point of the second magnetic board through the second output point of the output part, the first input terminal of the input circuit is electrically coupled with the first exit point of the first magnetic board through the first input point of the input part, and the second input terminal of the input circuit is electrically coupled with the second exit point of the second magnetic board through the second input point of the input part.

In an embodiment, the first magnetic board includes a first multilayered coil structure, and the second magnetic board includes a second multilayered coil structure. The first multilayered coil structure includes a first entry terminal and a first departure terminal. The second multilayered coil structure includes a second entry terminal and a second departure terminal. The first entry terminal of the first multilayered coil structure is connected with the first feed point of the first magnetic board. The first departure terminal of the first multilayered coil structure is connected with the first exit point of the first magnetic board. The second entry terminal of the second multilayered coil structure is connected with the second feed point of the second magnetic board. The second departure terminal of the second multilayered coil structure is connected with the second exit point of the second magnetic board.

In an embodiment, the first magnetic board is a combination of plural first magnetic plates in serial connection, and the second magnetic board is a combination of plural second magnetic plates in serial connection.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments and accompanying drawings.

Figure 1:
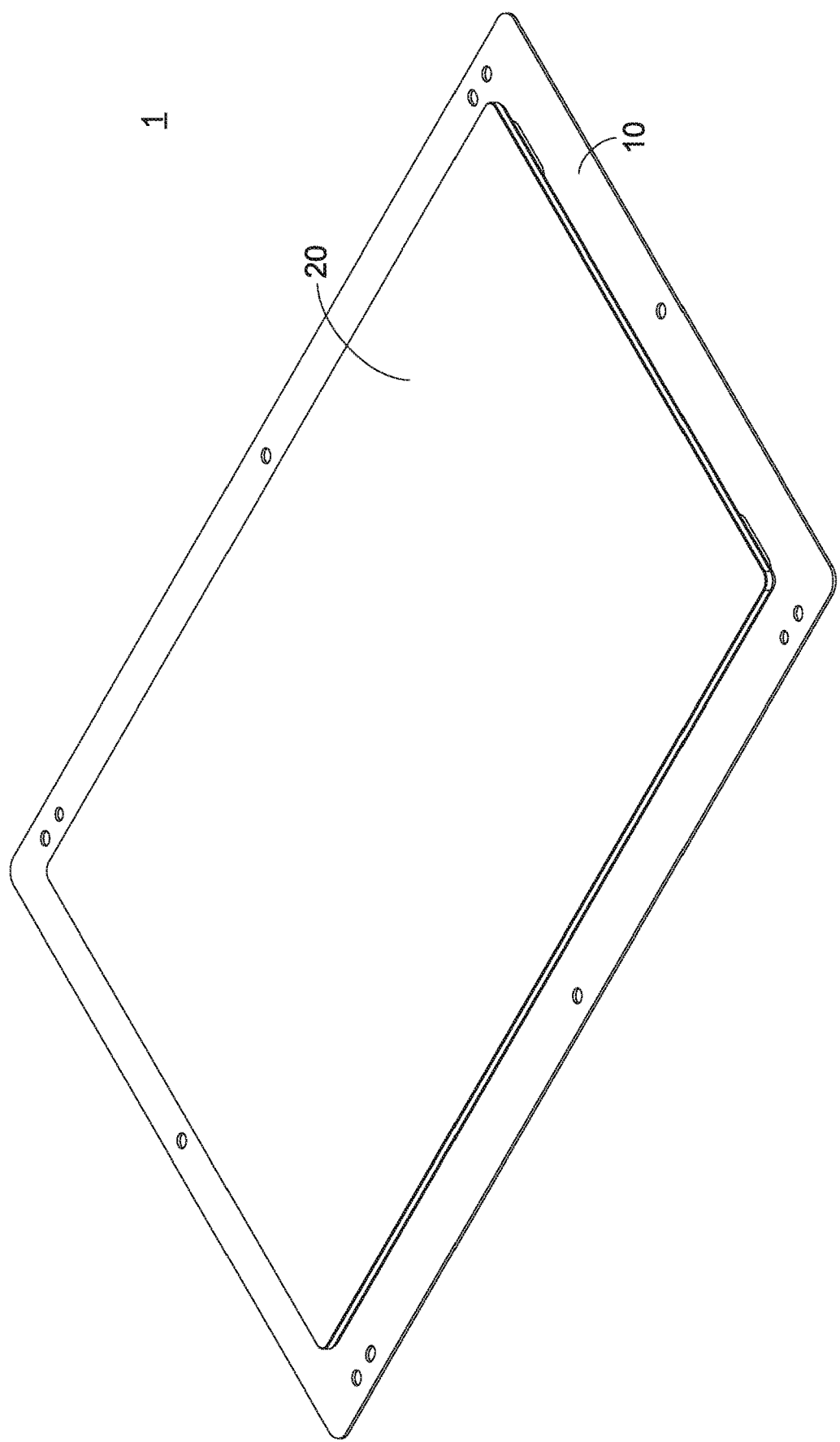
FIG. 1 is a schematic perspective view illustrating a touch module according to a first embodiment of the present invention.
Figure 2:
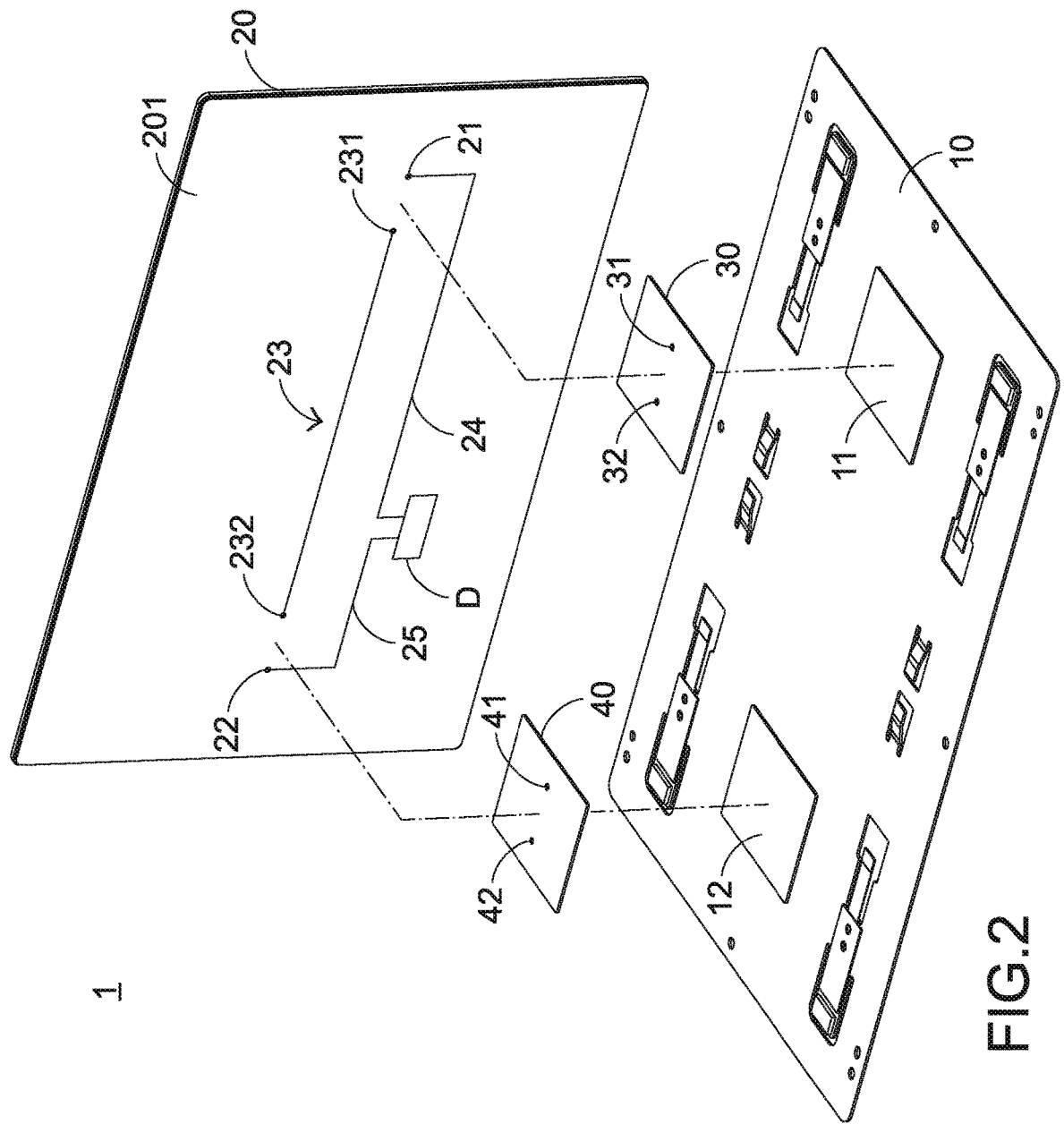
FIG. 2 is a schematic exploded view illustrating the touch module according to the first embodiment of the present invention.
Figure 3:
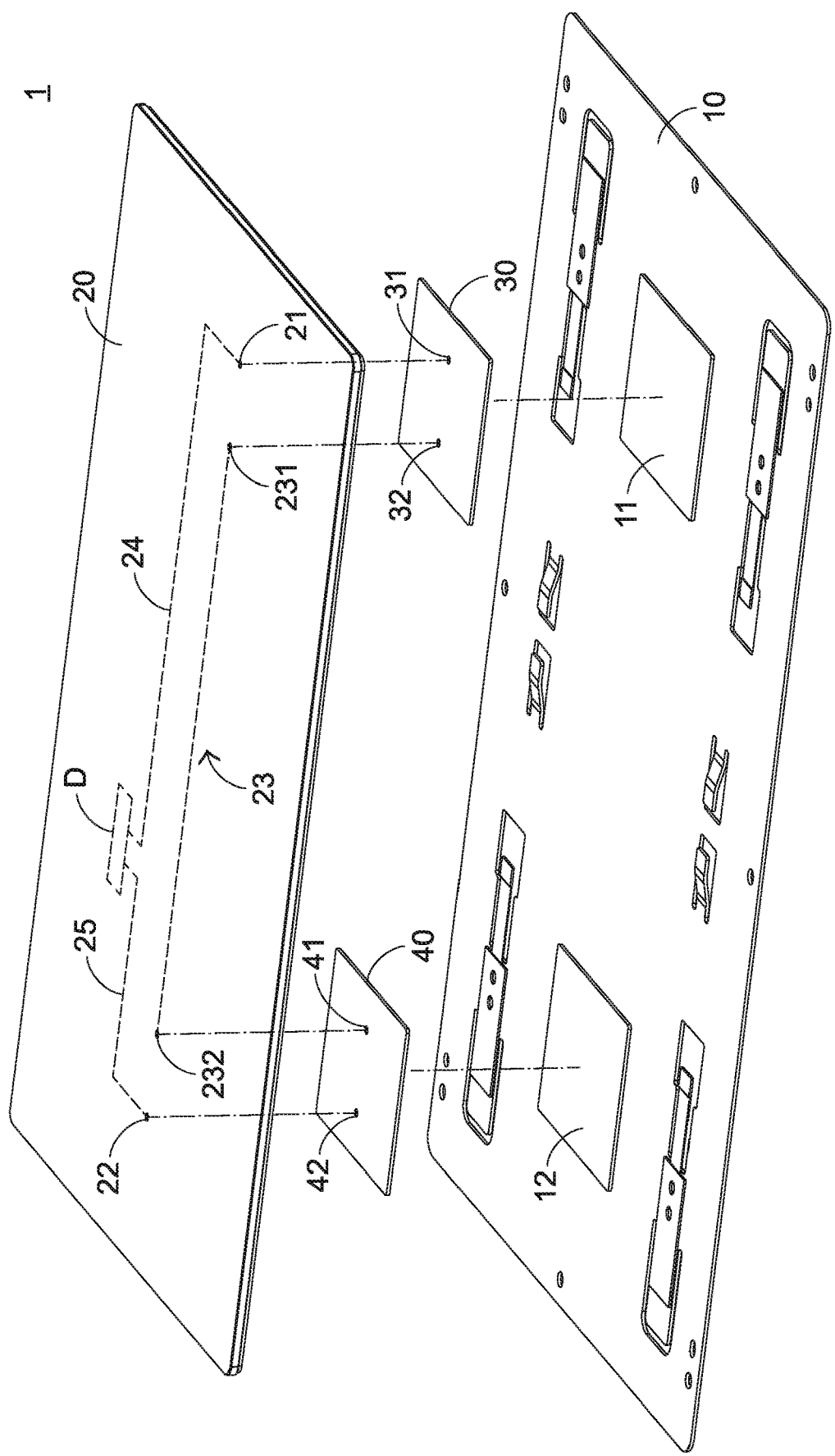
FIG. 3 schematically illustrates the circuitry structure of the touch module according to the first embodiment of the present invention.

FIG. 1 is a schematic perspective view illustrating a touch module according to a first embodiment of the present invention. FIG. 2 is a schematic exploded view illustrating the touch module according to the first embodiment of the present invention. FIG. 3 schematically illustrates the circuitry structure of the touch module according to the first embodiment of the present invention. As shown in FIGS. 1, 2 and 3, the touch module 1 comprises a base plate 10, a first magnet 11, a second magnet 12, a touch pad 20, a first magnetic board 30, a second magnetic board 40.

The touch pad 20 comprises an output point 21, an input point 22 and a communication part 23.

The first magnet 11 and the second magnet 12 are installed on the base plate 10. The installation positions of the first magnet 11 and the second magnet 12 are separated from each other. The touch pad 20 has a bottom surface 201. The touch pad 20 is located over the base plate 10. Moreover, the first magnet 11 and the second magnet 12 are covered by the touch pad 20. The bottom surface 201 of the touch pad 20 faces the first magnet 11 and the second magnet 12.

The first magnetic board 30 and the second magnetic board 40 are located under the touch pad 20 and coupled with the touch pad 20. In addition, the first magnetic board 30 and the second magnetic board 40 are electrically connected with the bottom surface 201 of the touch pad 20. The output point 21 of the touch pad 20 is electrically coupled with the first magnetic board 30. The input point 22 of the touch pad 20 is electrically coupled with the second magnetic board 40. The first magnetic board 30 and the second magnetic board 40 are electrically coupled with each other through the communication part 23 of the touch pad 20.

The first magnetic board 30 is aligned with the first magnet 11. The second magnetic board 40 is aligned with the second magnet 12. The installation positions of the first magnetic board 30 and the second magnetic board 40 are separated from each other. When electricity flows through the first magnetic board 30 and the second magnetic board 40, the first magnetic board 30 and the second magnetic board 40 induce the magnetic fields of the first magnet 11 and the second magnet 12. Due to the electromagnetic effect, the first magnetic board 30 and the second magnetic board 40 produce vibration. Consequently, the touch pad 20 is correspondingly vibrated.

In the touch module 1 of the first embodiment, the first magnetic board 30 and the second magnetic board 40 are electrically connected with each other in series. In addition, the first magnetic board 30 and the second magnetic board 40 are coupled with the touch pad 20. Consequently, the first magnetic board 30 and the second magnetic board 40 are electrically connected with each other through electrical traces in the touch pad 20.

In an embodiment, the touch pad 20 further comprises an output circuit 24, an input circuit 25 and a driving circuit D. The communication part 23 comprises a first conducting terminal 231 and a second conducting terminal 232. The first conducting terminal 231 and the second conducting terminal 232 are connected with each other. The first magnetic board 30 has a first feed point 31 and a first exit point 32. The second magnetic board 40 has a second feed point 41 and a second exit point 42.

The output point 21 and the input point 22 of the touch pad 20 are installed on the bottom surface 201 of the touch pad 20 and exposed outside. The first conducting terminal 231 and the second conducting terminal 232 of the communication part 23 are also installed on the bottom surface 201 of the touch pad 20 and exposed outside. In an embodiment, the output circuit 24, the input circuit 25 and the driving circuit D of the touch pad 20 are installed on the bottom surface 201 of the touch pad 20 and exposed outside. Alternatively, the output circuit 24, the input circuit 25 and the driving circuit D of the touch pad 20 are disposed within the touch pad 20 and not exposed. For illustration, the output circuit 24, the input circuit 25 and the driving circuit D of the touch pad 20 are installed on the bottom surface 201 of the touch pad 20 in the following example.

The first feed point 31 of the first magnetic board 30 is electrically coupled with the output point 21 of the touch pad 20. The first exit point 32 of the first magnetic board 30 is electrically coupled with the first conducting terminal 231 of the communication part 23 of the touch pad 20. The second feed point 41 of the second magnetic board 40 is electrically coupled with the second conducting terminal 232 of the communication part 23 of the touch pad 20. The second exit point 42 of the second magnetic board 40 is electrically coupled with the input point 22 of the touch pad 20. Since the first conducting terminal 231 and the second conducting terminal 232 of the communication part 23 are connected with each other, the first magnetic board 30 is connected with the touch pad 20 through the first exit point 32. In addition, the first magnetic board 30 and the second magnetic board 40 are electrically connected with each other through the communication part 23. Afterwards, the second magnetic board 40 is connected with the touch pad 20 through the second exit point 42. Consequently, the circuit of the first magnetic board 30 and the second magnetic board 40 are electrically connected with each other in series.

The driving circuit D of the touch pad 20 is in communication with the output circuit 24 and the input circuit 25. The output circuit 24 is in communication with the output point 21 of the touch pad 20. The input circuit 25 is in communication with the input point 22 of the touch pad 20. Consequently, the output circuit 24 is electrically coupled with the first magnetic board 30 through the output point 21, and the input circuit 25 is electrically coupled with the second magnetic board 40 through the input point 22.

The driving circuit D provides a driving current. After the driving current flows to the first magnetic board 30 through the output circuit 24, the driving current flows from the first magnetic board 30 to the second magnetic board 40 through the communication part 23, and then the driving current flows from the second magnetic board 40 back to the driving circuit D through input circuit 25. In other words, the single driving circuit D provides the driving current, and driving current flows to the first magnetic board 30 and the second magnetic board 40 through the serially-connected circuit. When the driving current flows through the first magnetic board 30 and the second magnetic board 40, the first magnetic board 30 and the second magnetic board 40 induce the magnetic fields and produce vibration. Consequently, the control precision is increased, and the vibration time error between different magnetic boards is reduced.

In addition, the spacing distance between the first magnetic board 30 and the second magnetic board 40 can be used as an available space, and the spacing distance between the first magnet 11 and the second magnet 12 can be used as another available space. Since some other components can be installed in these available spaces, the installation positions will not be interfered.

Figure 4:
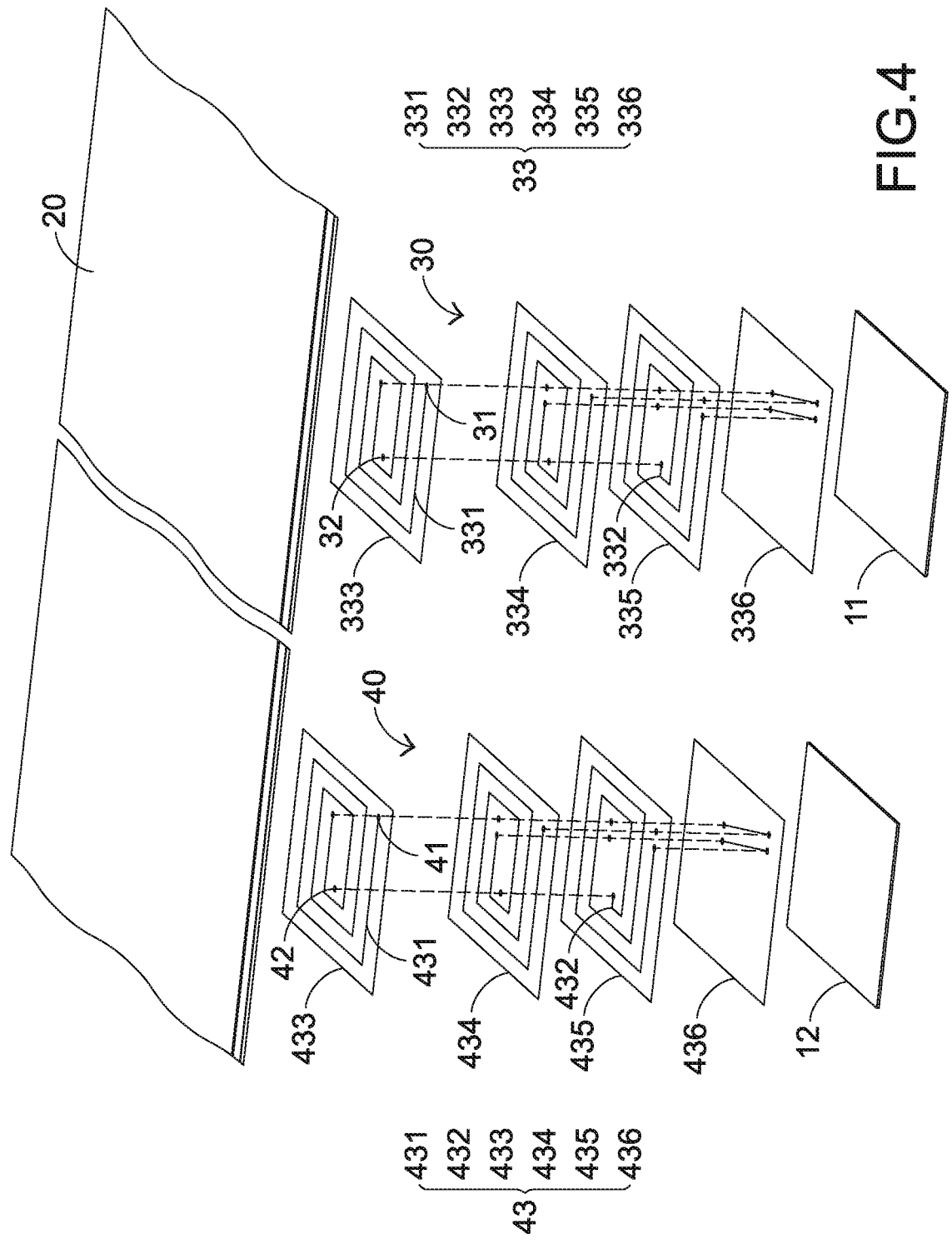
FIG. 4 is a schematic exploded view illustrating the multilayered coil structures of the first magnetic board and the second magnetic board in the touch module according to the first embodiment of the present invention.

In the first embodiment, each of the first magnetic board 30 and the second magnetic board 40 comprises a multilayered coil structure, which is a stack of plural coil layers. Please refer to FIGS. 3 and 4. FIG. 4 is a schematic exploded view illustrating the multilayered coil structures of the first magnetic board and the second magnetic board in the touch module according to the first embodiment of the present invention. The winding method of the multilayered coil structure is not restricted. An example of the multilayered coil structure will be described as follows. It is noted that the example of the multilayered coil structure is not restricted.

The first magnetic board 30 comprises a first multilayered coil structure 33. The first multilayered coil structure 33 comprises a first entry terminal 331, a first departure terminal 332, a first upper coil layer 333, a first intermediate coil layer 334, a first lower coil layer 335 and a first communication line layer 336. Each of the first upper coil layer 333, the first intermediate coil layer 334 and the first lower coil layer 335 is equipped with a conductive coil therein. The conductive coil is wound as a planer coil. A conductive line is formed in the first communication line layer 336. The first upper coil layer 333, the first intermediate coil layer 334, the first lower coil layer 335 and the first communication line layer 336 are electrically connected with each other. Consequently, the conductive coils of all layers and the conductive line are in communication with each other. Due to the above structural design, the multilayered coil structure composed of plural coil layers in a stack form can be produced.

The first entry terminal 331 of the first multilayered coil structure 33 is connected with the first feed point 31 of the first magnetic board 30. The first departure terminal 332 of the first multilayered coil structure 33 is connected with the first exit point 32 of the first magnetic board 30. The driving current from the driving circuit D of the touch pad 20 flows into the first multilayered coil structure 33 through the first feed point 31 of the first magnetic board 30. After the driving current flows through the first upper coil layer 333, the first intermediate coil layer 334, the first lower coil layer 335 and the first communication line layer 336, the driving current flows back to the touch pad 20 through the first exit point 32 of the first magnetic board 30.

The second magnetic board 40 comprises a second multilayered coil structure 43. The second multilayered coil structure 43 comprises a second entry terminal 431, a second departure terminal 432, a second upper coil layer 433, a second intermediate coil layer 434, a second lower coil layer 435 and a second communication line layer 436. Each of the second upper coil layer 433, the second intermediate coil layer 434 and the second lower coil layer 435 is equipped with a conductive coil therein. The conductive coil is wound as a planer coil. A conductive line is formed in the second communication line layer 436. The second upper coil layer 433, the second intermediate coil layer 434, the second lower coil layer 435 and the second communication line layer 436 are electrically connected with each other. Consequently, the conductive coils of all layers and the conductive line are in communication with each other. Due to the above structural design, the multilayered coil structure composed of plural coil layers in a stack form can be produced.

The second entry terminal 431 of the second multilayered coil structure 43 is connected with the second feed point 41 of the second magnetic board 40. The second departure terminal 432 of the second multilayered coil structure 43 is connected with the second exit point 42 of the second magnetic board 40. The driving current from the driving circuit D of the touch pad 20 flows into the second multilayered coil structure 43 through the second feed point 41 of the second magnetic board 40. After the driving current flows through the second upper coil layer 433, the second intermediate coil layer 434, the second lower coil layer 435 and the second communication line layer 436, the driving current flows back to the touch pad 20 through the second exit point 42 of the second magnetic board 40.

Figure 5:
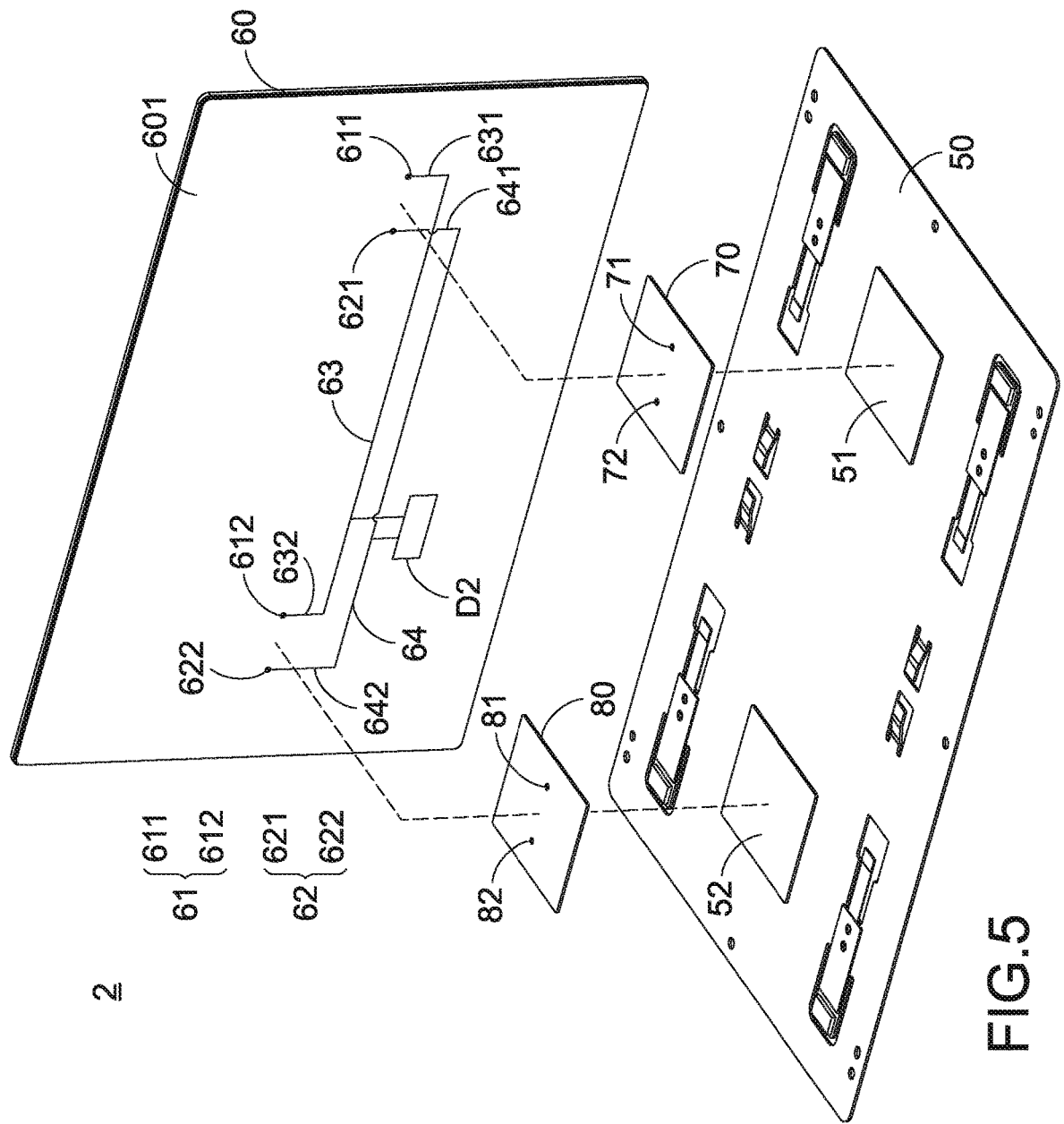
FIG. 5 is a schematic exploded view illustrating a touch module according to a second embodiment of the present invention.
Figure 6:
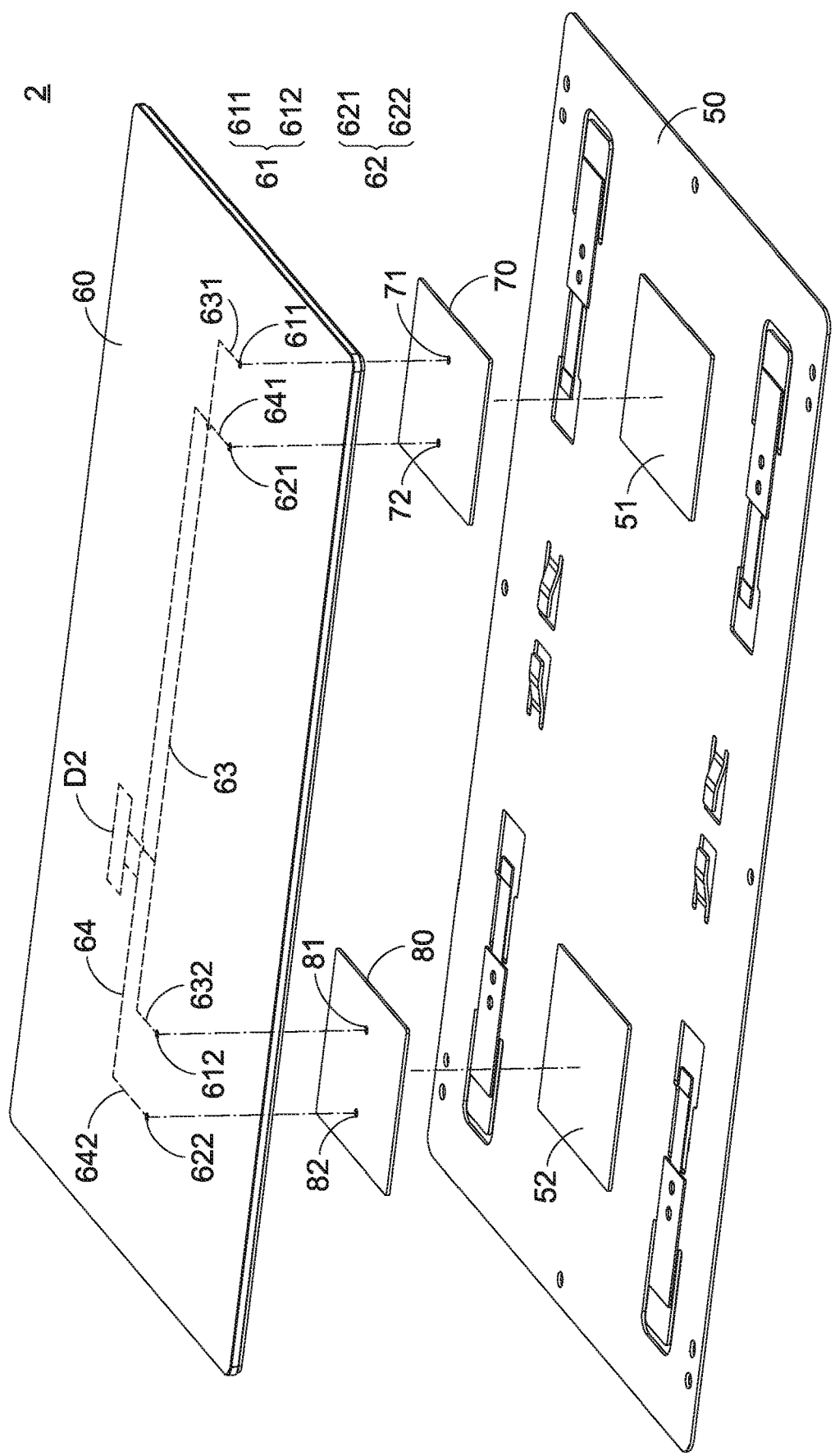
FIG. 6 schematically illustrates the circuitry structure of the touch module according to the second embodiment of the present invention.
Figure 7:
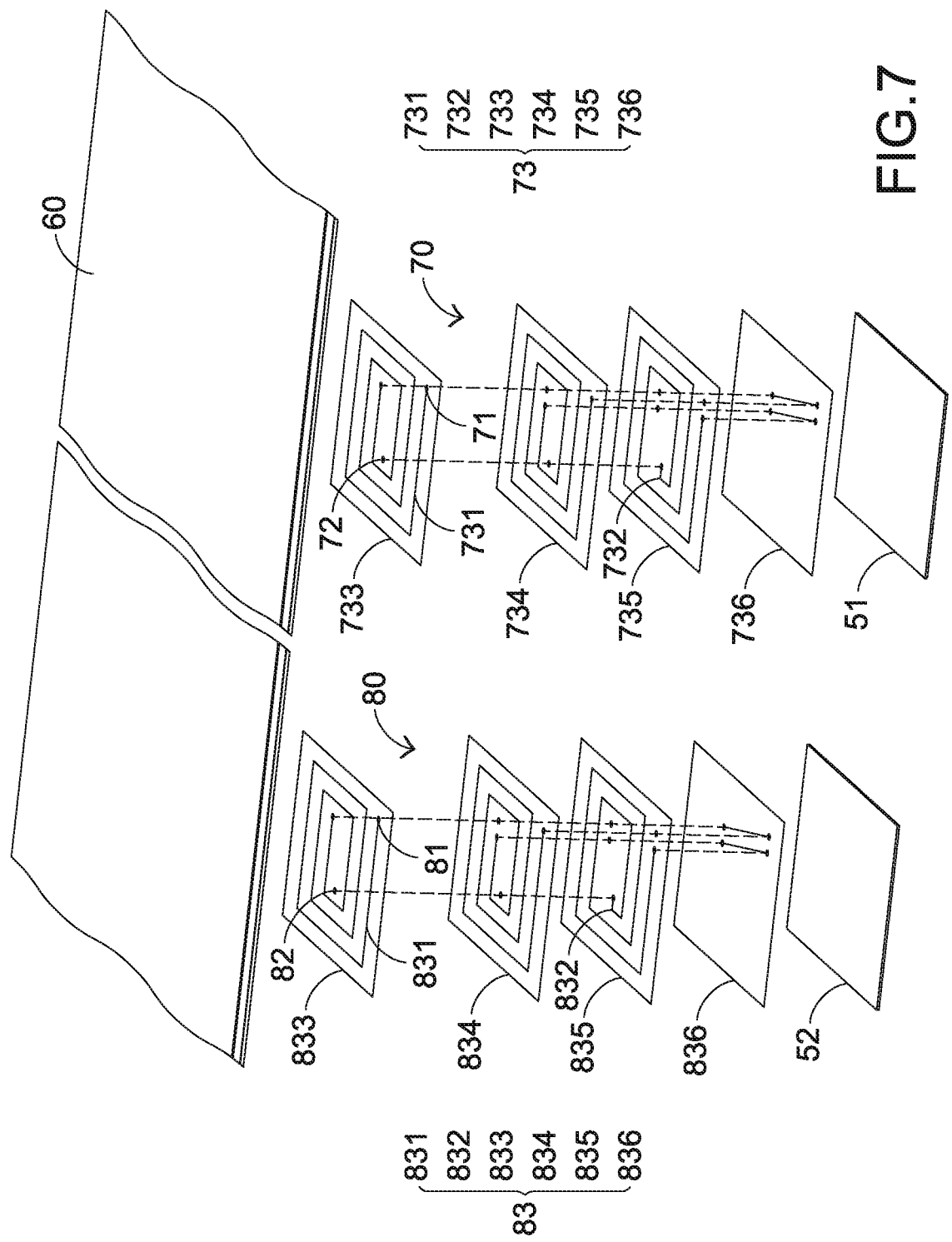
FIG. 7 is a schematic exploded view illustrating the multilayered coil structures of the first magnetic board and the second magnetic board in the touch module according to the second embodiment of the present invention.

The present invention further provides a touch module of a second embodiment. FIG. 5 is a schematic exploded view illustrating a touch module according to a second embodiment of the present invention. FIG. 6 schematically illustrates the circuitry structure of the touch module according to the second embodiment of the present invention. FIG. 7 is a schematic exploded view illustrating the multilayered coil structures of the first magnetic board and the second magnetic board in the touch module according to the second embodiment of the present invention.

In this embodiment, the touch module 2 comprises a base plate 50, a first magnet 51, a second magnet 52, a touch pad 60, a first magnetic board 70 and a second magnetic board 80.

The touch pad 60 comprises a bottom surface 601, an output part 61, an input part 62, an output circuit 63, an input circuit 64 and a driving circuit D2.

The first magnet 51 and the second magnet 52 are installed on the base plate 50. The installation positions of the first magnet 51 and the second magnet 52 are separated from each other.

The touch pad 60 is located over the base plate 50. Moreover, the first magnet 51 and the second magnet 52 are covered by the touch pad 60. The bottom surface 601 of the touch pad 60 faces the first magnet 51 and the second magnet 52.

The output part 61 and the input part 62 of the touch pad 60 are installed on the bottom surface 601 of the touch pad 60 and exposed outside. In an embodiment, the output circuit 63, the input circuit 64 and the driving circuit D2 of the touch pad 60 are installed on the bottom surface 601 of the touch pad 60 and exposed outside. Alternatively, the output circuit 63, the input circuit 64 and the driving circuit D2 of the touch pad 60 are disposed within the touch pad 60 and not exposed. The driving circuit D2 is electrically connected with the output circuit 63 and the input circuit 64. The output circuit 63 is electrically connected with the output part 61. The input circuit 64 is electrically connected with the input part 62.

The first magnetic board 70 is a single magnetic plate or a combination of plural parallel magnetic plates in serial connection. Similarly, the second magnetic board 80 is a single magnetic plate or a combination of plural parallel magnetic plates in serial connection. For illustration, each of the first magnetic board 70 and the second magnetic board 80 is a single magnetic plate in the following example.

The first magnetic board 70 has a first feed point 71 and a first exit point 72. The second magnetic board 80 has a second feed point 81 and a second exit point 82. The first magnetic board 70 and the second magnetic board 80 are located under the bottom surface 601 of the touch pad 60 and coupled with the touch pad 60. The output part 61 of the touch pad 60 comprises a first output point 611 and a second output point 612. The input part 62 of the touch pad 60 comprises a first input point 621 and a second input point 622.

The first magnetic board 70 is aligned with the first magnet 51. The second magnetic board 80 is aligned with the second magnet 52. The installation positions of the first magnetic board 70 and the second magnetic board 80 are separated from each other. The first feed point 71 of the first magnetic board 70 and the second feed point 81 of the second magnetic board 80 are electrically coupled with the output part 61 of the touch pad 60. The first magnetic board 70 is electrically coupled with the first output point 611 of the output part 61 through the first feed point 71. The second magnetic board 80 is electrically coupled with the second output point 612 of the output part 61 through the second feed point 81. The first exit point 72 of the first magnetic board 70 and the second exit point 82 of the second magnetic board 80 are electrically coupled with the input part 62 of the touch pad 60. The first magnetic board 70 is electrically coupled with the first input point 621 of the input part 62 through the first exit point 72. The second magnetic board 80 is electrically coupled with the second input point 622 of the input part 62 through the second exit point 82.

The output circuit 63 of the touch pad 60 has a first output terminal 631 and a second output terminal 632. The input circuit 64 of the touch pad 60 has a first input terminal 641 and a second input terminal 642. The first output terminal 631 of the output circuit 63 is connected with the first output point 611 of the output part 61. The second output terminal 632 of the output circuit 63 is connected with the second output point 612 of the output part 61. The first input terminal 641 of the input circuit 64 is connected with the first input point 621 of the input part 62. The second input terminal 642 of the input circuit 64 is connected with the second input point 622 of the input part 62.

The first output terminal 631 of the output circuit 63 is electrically coupled with the first feed point 71 of the first magnetic board 70 through the first output point 611 of the output part 61. The second output terminal 632 of the output circuit 63 is electrically coupled with the second feed point 81 of the second magnetic board 80 through the second output point 612 of the output part 61. The first input terminal 641 of the input circuit 64 is electrically coupled with the first exit point 72 of the first magnetic board 70 through the first input point 621 of the input part 62. The second input terminal 642 of the input circuit 64 is electrically coupled with the second exit point 82 of the second magnetic board 80 through the second input point 622 of the input part 62.

The driving circuit D2 of the touch pad 60 provides a driving current. The driving current flows to the first output point 611 and the second output point 612 of the output part 61 through the output circuit 63. The driving current from the first output point 611 of the output part 61 flows to the first magnetic board 70 through the first feed point 71, and then the driving current flows from the first magnetic board 70 to the first input point 621 of the input part 62 through the first exit point 72. Consequently, the driving current flows back to the driving circuit D2 of the touch pad 60 through the input part 62. The driving current from the second output point 612 of the output part 61 flows to the second magnetic board 80 through the second feed point 81, and then the driving current flows from the second magnetic board 80 to the second input point 622 of the input part 62 through the second exit point 82. Consequently, the driving current flows back to the driving circuit D2 of the touch pad 60 through the input part 62. When the driving current flows through the first magnetic board 70, the first magnetic board 70 induces the magnetic field of the first magnet 51 and produces vibration. When the driving current flows through the second magnetic board 80, the second magnetic board 80 induces the magnetic field of the second magnet 52 and produces vibration.

In the second embodiment, each of the first magnetic board 70 and the second magnetic board 80 comprises a multilayered coil structure, which is a stack of plural coil layers. Please refer to FIG. 7. The winding method of the multilayered coil structure is not restricted. An example of the multilayered coil structure will be described as follows. It is noted that the example of the multilayered coil structure is not restricted.

The method of winding the multilayered coil structure of the second embodiment is similar to that of the first embodiment, and not redundantly described herein.

The first magnetic board 70 comprises a first multilayered coil structure 73. The first multilayered coil structure 73 comprises a first entry terminal 731, a first departure terminal 732, a first upper coil layer 733, a first intermediate coil layer 734, a first lower coil layer 735 and a first communication line layer 736. Each of the first upper coil layer 733, the first intermediate coil layer 734 and the first lower coil layer 735 is equipped with a conductive coil therein. The conductive coil is wound as a planer coil. A conductive line is formed in the first communication line layer 736. The first upper coil layer 733, the first intermediate coil layer 734, the first lower coil layer 735 and the first communication line layer 736 are electrically connected with each other. Consequently, the conductive coils of all layers and the conductive line are in communication with each other. Due to the above structural design, the multilayered coil structure composed of plural coil layers in a stack form can be produced.

The first entry terminal 731 of the first multilayered coil structure 73 is connected with the first feed point 71 of the first magnetic board 70. The first departure terminal 732 of the first multilayered coil structure 73 is connected with the first exit point 72 of the first magnetic board 70. The driving current outputted from the touch pad 60 flows into the first multilayered coil structure 73 through the first feed point 71 of the first magnetic board 70. Then, the driving current flows back to the touch pad 60 through the first exit point 72 of the first magnetic board 70.

The second magnetic board 80 comprises a second multilayered coil structure 83. The second multilayered coil structure 83 comprises a second entry terminal 831, a second departure terminal 832, a second upper coil layer 833, a second intermediate coil layer 834, a second lower coil layer 835 and a second communication line layer 836. Each of the second upper coil layer 833, the second intermediate coil layer 834 and the second lower coil layer 835 is equipped with a conductive coil therein. The conductive coil is wound as a planer coil. A conductive line is formed in the second communication line layer 836. The second upper coil layer 833, the second intermediate coil layer 834, the second lower coil layer 835 and the second communication line layer 836 are electrically connected with each other. Consequently, the conductive coils of all layers and the conductive line are in communication with each other. Due to the above structural design, the multilayered coil structure composed of plural coil layers in a stack form can be produced.

The second entry terminal 831 of the second multilayered coil structure 83 is connected with the second feed point 81 of the second magnetic board 80. The second departure terminal 832 of the second multilayered coil structure 83 is connected with the second exit point 82 of the second magnetic board 80. The driving current outputted from the touch pad 20 flows into the second multilayered coil structure 83 through the second feed point 81 of the second magnetic board 80. Then, the driving current flows back to the touch pad 60 through the second exit point 82 of the second magnetic board 80.

In the touch module 2 of this embodiment, the first magnetic board 70 and the second magnetic board 80 are connected with the driving circuit D2 of the touch pad 60 in parallel. In addition, the first magnetic board 70 and the second magnetic board 80 are coupled with the touch pad 60. Consequently, the first magnetic board 70 and the second magnetic board 80 are electrically connected with each other through electrical traces (i.e., the output circuit 63 and the input circuit 24) in the touch pad 60.

Since the first magnetic board 70 and the second magnetic board 80 are connected with the driving circuit D2 of the touch pad 60 in parallel, the purpose of distributing plural magnetic plates can be achieved. Consequently, plural vibration sources are distributed in the same touch module, and the overall touch module is capable of providing the uninform vibrating effect. More especially, even if one of the magnetic boards is damaged, the other magnetic board can be operated normally.

Figure 8:
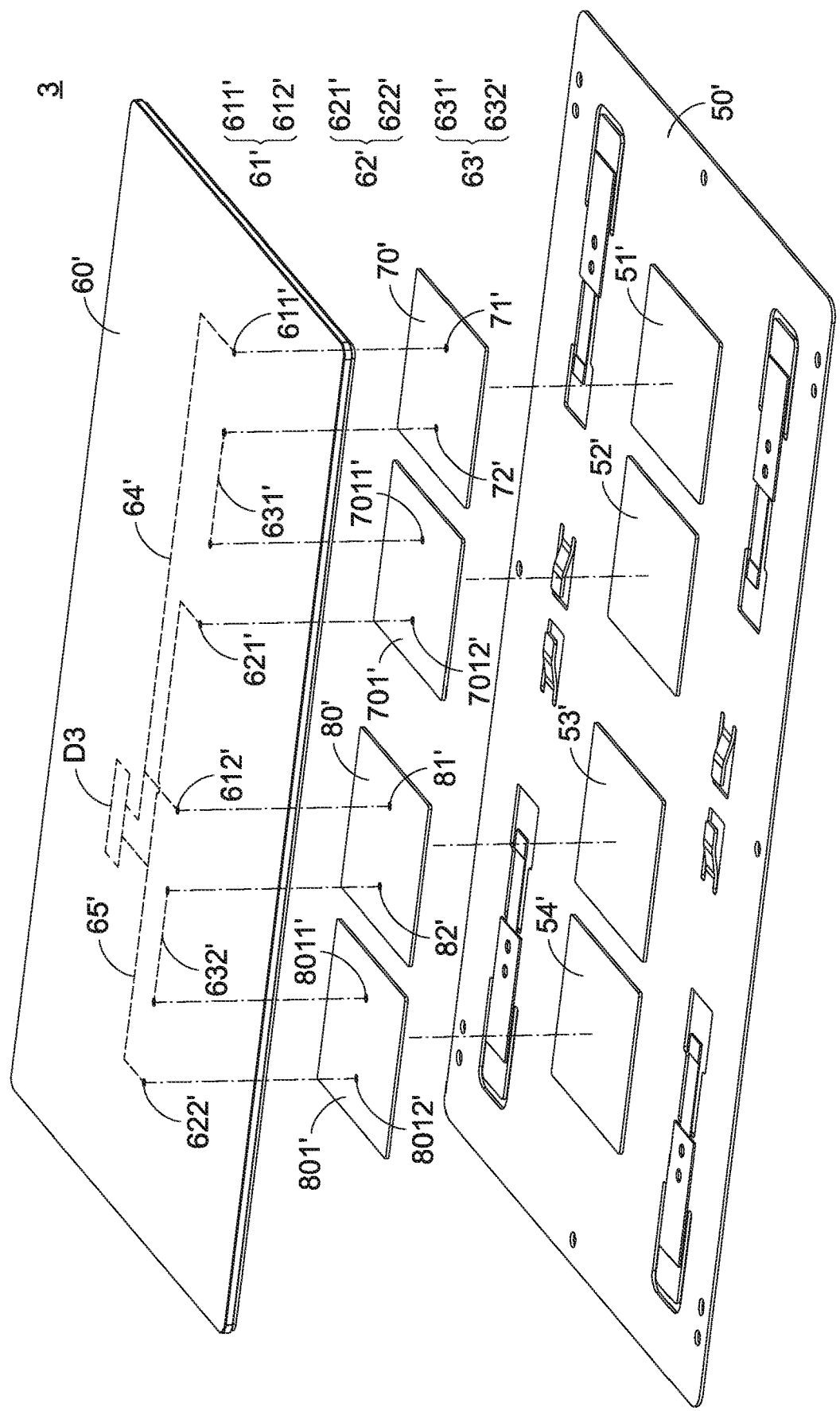
FIG. 8 schematically illustrates the circuitry structure of a touch module according to a third embodiment of the present invention.

The present invention further provides a touch module of a third embodiment. FIG. 8 schematically illustrates the circuitry structure of a touch module according to a third embodiment of the present invention. The method of connecting portions of the magnetic boards and the method of winding the multilayered coil structure in the third embodiment are similar to those of the first embodiment and the second embodiment, and not redundantly described herein.

In the touch module 3 of the third embodiment, the plural magnetic boards are electrically connected with each other in parallel and in series.

In this embodiment, the touch module 3 comprises a base plate 50', a first magnet 51', a second magnet 52', a third magnet 53', a fourth magnet 54', a touch pad 60', a first magnetic board 70', a second magnetic board 701', a third magnetic board 80' and a fourth magnetic board 801'. The touch pad 60' comprises an output part 61', an input part 62', a communication part 63', an output circuit 64', an input circuit 65' and a driving circuit D3.

The output part 61' of the touch pad 60' comprises a first output point 611' and a second output point 612'. The input part 62' of the touch pad 60' comprises a first input point 621' and a second input point 622'. The communication part 63' comprises a first communication line 631' and a second communication line 632'.

The first magnetic board 70' has a first feed point 71' and a first exit point 72'. The second magnetic board 701' has a second feed point 7011' and a second exit point 7012'. The third magnetic board 80' has a third feed point 81' and a third exit point 82'. The third magnetic board 801' has a fourth feed point 8011' and a fourth exit point 8012'.

The first magnet 51', the second magnet 52', the third magnet 53' and the fourth magnet 54' are installed on the base plate 50'. The touch pad 60' is located over the base plate 50'. Moreover, the first magnet 51', the second magnet 52', the third magnet 53' and the fourth magnet 54' are covered by the touch pad 60'. Moreover, all of the first magnetic board 70', the second magnetic board 701', the third magnetic board 80' and the fourth magnetic board 801' are coupled with the touch pad 60'.

The first magnetic board 70' is aligned with the first magnet 51'. The second magnetic board 701' is aligned with the second magnet 52'. The third magnetic board 80' is aligned with the third magnet 53'. The fourth magnetic board 801' is aligned with the fourth magnet 54'.

The method of connecting the magnetic boards in series will be described as follows.

Firstly, the first magnetic board 70' and the second magnetic board 701' are connected with each other in series through the first communication line 631' of the communication part 63'. The first magnetic board 70' is connected with the first communication line 631' of the communication part 63' through the first exit point 72'. The second magnetic board 701' is connected with the first communication line 631' of the communication part 63' through the second feed point 7011'.

The third magnetic board 80' and the fourth magnetic board 801' are connected with each other in series through the second communication line 632' of the communication part 63'. The third magnetic board 80' is connected with the second communication line 632' of the communication part 63' through the third exit point 82'. The fourth magnetic board 801' is connected with the second communication line 632' of the communication part 63' through the fourth feed point 8011'.

Due to the above design, the first magnetic board 70' and the second magnetic board 701' are serially connected as a group, and the third magnetic board 80' and the fourth magnetic board 801' are serially connected as another group. After the driving current flows into the first feed point 71' of the first magnetic board 70', the driving current flows out from the second exit point 7012' of the second magnetic board 701'. Similarly, after the driving current flows into the third feed point 81' of the third magnetic board 80', the driving current flows out from the fourth exit point 8012' of the fourth magnetic board 801'.

The method of connecting the magnetic boards in parallel will be described as follows.

The driving circuit D3 provides a driving current to the output circuit 64'. The output circuit 64' is electrically connected with the first output point 611' and the second output point 612' of the output part 61' in order to output the driving current. The input circuit 65' is electrically connected with the first input point 621' and the second input point 622' of the input part 62' in order to receive the driving current.

The first magnetic board 70' is electrically coupled with the first output point 611' of the output part 61' through the first feed point 71'. Consequently, the driving current flows into the first magnetic board 70'. The third magnetic board 80' is electrically coupled with the second output point 612' of the output part 61' through the third feed point 81'. Consequently, the driving current flows into the third magnetic board 80'.

The second exit point 7012' of the second magnetic board 701' is electrically coupled with the first input point 621' of the input part 62'. Consequently, the driving current flows out from the second magnetic board 701' and flows back to the driving circuit D3 of the touch pad 60'. The fourth exit point 8012' of the fourth magnetic board 801' is electrically coupled with the second input point 622' of the input part 62'. Consequently, the driving current flows out of the fourth magnetic board 801' and flows back to the driving circuit D3 of the touch pad 60'.

Due to the above design, the serially-connected structure of the first magnetic board 70' and the second magnetic board 701' and the serially-connected structure of the third magnetic board 80' and the fourth magnetic board 801' are connected with each other in parallel.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A touch module, comprising:
a base plate;
a first magnet installed on the base plate;
a second magnet installed on the base plate and separated from the first magnet;
a touch pad located over the base plate to cover the first magnet and the second magnet, wherein the touch pad comprises an output point, an input point and a communication part;
a first magnetic board located under the touch pad, coupled with the touch pad, and aligned with the first magnet; and
a second magnetic board located under the touch pad, coupled with the touch pad, and aligned with the second magnet, wherein the second magnetic board is separated from the first magnetic board,
wherein the output point of the touch pad is electrically coupled with the first magnetic board, the input point of the touch pad is electrically coupled with the second magnetic board, and the first magnetic board and the second magnetic board are electrically connected with each other through the communication part of the touch pad, wherein the first magnetic board induces a magnetic field of the first magnet and generates vibration, and the second magnetic board induces a magnetic field of the second magnet and generates vibration,
wherein the touch pad has a bottom surface, wherein the bottom surface of the touch pad faces the first magnet and the second magnet, and the output point and the input point of the touch pad are installed on the bottom surface of the touch pad and exposed outside,
wherein the touch pad comprises a driving circuit, an output circuit and an input circuit, wherein the driving circuit is connected with the output circuit and the input circuit, the output circuit is electrically coupled with the first magnetic board through the output point, and the input circuit is electrically coupled with the second magnetic board through the input point.

2. The touch module according to claim 1, wherein the first magnetic board has a first feed point and a first exit point, and the second magnetic board has a second feed point and a second exit point, wherein the first feed point of the first magnetic board is electrically coupled with the output point of the touch pad, the first exit point of the first magnetic board and the second feed point of the second magnetic board are electrically coupled with the communication part of the touch pad, and the second exit point of the second magnetic board is electrically coupled with the input point of the touch pad.

3. The touch module according to claim 2, wherein the first magnetic board comprises a first multilayered coil structure, and the second magnetic board comprises a second multilayered coil structure, wherein the first multilayered coil structure comprises a first entry terminal and a first departure terminal, and the second multilayered coil structure comprises a second entry terminal and a second departure terminal, wherein the first entry terminal of the first multilayered coil structure is connected with the first feed point of the first magnetic board, the first departure terminal of the first multilayered coil structure is connected with the first exit point of the first magnetic board, the second entry terminal of the second multilayered coil structure is connected with the second feed point of the second magnetic board, and the second departure terminal of the second multilayered coil structure is connected with the second exit point of the second magnetic board.

4. The touch module according to claim 2, wherein the communication part of the touch pad comprises a first conducting terminal and a second conducting terminal, and the first conducting terminal and the second conducting terminal are connected with each other, wherein the first exit point of the first magnetic board is electrically coupled with the first conducting terminal of the communication part, and the second feed point of the second magnetic board is electrically coupled with the second conducting terminal of the communication part.

5. A touch module, comprising:
a base plate;
a first magnet installed on the base plate;
a second magnet installed on the base plate and separated from the first magnet;
a touch pad located over the base plate to cover the first magnet and the second magnet, wherein the touch pad comprises an output part and an input part;
a first magnetic board located under the touch pad, coupled with the touch pad, and aligned with the first magnet, wherein the first magnetic board has a first feed point and a first exit point; and
a second magnetic board located under the touch pad, coupled with the touch pad, and aligned with the second magnet, wherein the second magnetic board is separated from the first magnetic board, and the second magnetic board has a second feed point and a second exit point,
wherein the first feed point of the first magnetic board and the second feed point of the second magnetic board are electrically coupled with the output part of the touch pad, and the first exit point of the first magnetic board and the second exit point of the second magnetic board are electrically coupled with the input part of the touch pad, wherein the first magnetic board induces a magnetic field of the first magnet and generates vibration, and the second magnetic board induces a magnetic field of the second magnet and generates vibration,
wherein the touch pad has a bottom surface, and the output part and the input part of the touch pad are installed on the bottom surface of the touch pad and exposed outside, wherein the output part comprises a first output point and a second output point, and the input part comprises a first input point and a second input point, wherein the first feed point of the first magnetic board is electrically coupled with the first output point of the output part, the second feed point of the second magnetic board is electrically coupled with the second output point of the output part, the first exit point of the first magnetic board is electrically coupled with the first input point of the input part, and the second exit point of the second magnetic board is electrically coupled with the second input point of the input part,
wherein the touch pad comprises a driving circuit, an output circuit and an input circuit, wherein the driving circuit is connected with the output circuit and the input circuit, the output circuit has a first output terminal and a second output terminal, and the input circuit has a first input terminal and a second input terminal, wherein the first output terminal of the output circuit is connected with the first output point of the output part, the second output terminal of the output circuit is connected with the second output point of the output part, the first input terminal of the input circuit is connected with the first input point of the input part, and the second input terminal of the input circuit is connected with the second input point of the input part.

6. The touch module according to claim 5, wherein the first output terminal of the output circuit is electrically coupled with the first feed point of the first magnetic board through the first output point of the output part, the second output terminal of the output circuit is electrically coupled with the second feed point of the second magnetic board through the second output point of the output part, the first input terminal of the input circuit is electrically coupled with the first exit point of the first magnetic board through the first input point of the input part, and the second input terminal of the input circuit is electrically coupled with the second exit point of the second magnetic board through the second input point of the input part.

7. The touch module according to claim 5, wherein the first magnetic board comprises a first multilayered coil structure, and the second magnetic board comprises a second multilayered coil structure, wherein the first multilayered coil structure comprises a first entry terminal and a first departure terminal, and the second multilayered coil structure comprises a second entry terminal and a second departure terminal, wherein the first entry terminal of the first multilayered coil structure is connected with the first feed point of the first magnetic board, the first departure terminal of the first multilayered coil structure is connected with the first exit point of the first magnetic board, the second entry terminal of the second multilayered coil structure is connected with the second feed point of the second magnetic board, and the second departure terminal of the second multilayered coil structure is connected with the second exit point of the second magnetic board.

8. The touch module according to claim 5, wherein the first magnetic board is a combination of plural first magnetic plates in serial connection, and the second magnetic board is a combination of plural second magnetic plates in serial connection.

\* \* \* \* \*